US000001819H

United States Statutory Invention Registration [19]

[11] Reg. Number: H1,819

Anderson et al.

[45] Published: Dec. 7, 1999

[54] BALE SHAPE MONITOR FOR ROUND BALERS

[75] Inventors: J. Dale Anderson, Canton; Craig Pecenka; Lavern R. Goossen, both of Newton, all of Kans.

[73] Assignee: Hay & Forage Industries, Hesston, Kans.

[21] Appl. No.: 09/047,834

[22] Filed: Mar. 25, 1998

[51] Int. Cl.[6] ..... A01D 75/00

[52] U.S. Cl. ..... 56/341

[58] Field of Search ..... 56/341, 16.4 R, 56/10.2 R, DIG. 15; 100/88; 33/555.1

[56] References Cited

U.S. PATENT DOCUMENTS

| | | | |
|---|---|---|---|
| 4,224,867 | 9/1980 | Gaeddert et al. | 100/88 |
| 4,850,271 | 7/1989 | White et al. | 100/88 |
| 4,855,924 | 8/1989 | Strosser et al. | 364/468 |
| 4,924,405 | 5/1990 | Strosser et al. | 364/468 |
| 5,131,214 | 7/1992 | Vermeer | 56/10.2 |
| 5,182,987 | 2/1993 | Viaud | 100/87 |
| 5,408,817 | 4/1995 | Wagstaff | 56/341 |
| 5,444,969 | 8/1995 | Wagstaff et al. | 56/341 |
| 5,605,095 | 2/1997 | McClure | 100/99 |
| 5,615,544 | 4/1997 | Berger et al. | 56/341 |
| 5,622,104 | 4/1997 | Viesselmann et al. | 100/88 |

FOREIGN PATENT DOCUMENTS

| | | | |
|---|---|---|---|
| 0060956 | 9/1982 | European Pat. Off. | 56/341 |

*Primary Examiner*—Charles T. Jordan
*Assistant Examiner*—Meena Chelliah
*Attorney, Agent, or Firm*—Hovey, Williams, Timmons & Collins

[57] ABSTRACT

A round baler includes a bale shape monitor for facilitating uniform bale formation. The bale shape monitor includes a pair of end sensors and an intermediate sensor. The end sensors sense the diameter of the bale at end locations adjacent opposite ends of the bale, while the intermediate sensor senses the diameter of the bale at an intermediate location spaced between the end locations. The monitor further includes a signal responsive to the sensors to indicate to the operator when the diameter of the bale at one of the end locations is less than the diameter at the intermediate location. The signal is electrically powered and includes a pair of switches, each of which is operably coupled between one of the end sensors and the intermediate sensor to operate an indicator when the diameter of the bale sensed at the corresponding end location is less than the diameter sensed at the intermediate location.

31 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

BALE SHAPE MONITOR FOR ROUND BALERS

BACKGROUND OF THE INVENTION

1. Field of the Invention

The present invention relates generally to round balers and, more particularly, to an improved bale shape monitor for facilitating uniform bale formation by the baler.

2. Discussion of Prior Art

In most instances, the crop windrow picked up by a round baler tends to be narrower than the overall length of the baling chamber. The baler must consequently be steered left and right as it pulled across the field so that an equal amount of crop material is delivered along the length of the chamber during the bale cycle; otherwise, the baler will likely form an asymmetrical bale having an uneven diameter from one end to end the other end. For example, if the baler is positioned relative to the windrow so that a disproportionate amount of crop is delivered to the left end of the baling chamber, the bale will almost definitely have a conical shape, with the left end of the bale having a greater diameter and density than the right end. In any case, nonuniform bale formation results in unsightly bales that are difficult to sell, stack and tie. Moreover, nonuniform bale formation often damages or, at the very least, places undue wear on the bale forming components.

Even the most skillful baler operator has difficultly in tediously weaving the baler from side to side for ensuring even delivery of crop material between the sidewalls of the baler. Accordingly, bale shape monitors have been developed to assist the operator with uniform bale formation. Conventional bale shape monitors typically include indicators placed within the cab of the tractor to signal to the operator when the bale is not being properly shaped. Traditional indicators include bale shape displays which represent the shape of the bale from end-to-end or at certain locations along the length of the bale. A more common indicator includes so-called "driving lights" which signal to the operator when to steer left, steer right or simply drive forward. Additionally, some balers have even been equipped with a steering mechanism for automatically steering the baler left and right in response to the bale shape sensed by the monitor.

The indicators mentioned above are traditionally operated by one or more sensors on the baler. In round balers having an expandable baling chamber defined in part by a plurality of endless elements (e.g., a belt-type baler), the sensors are associated with the endless elements adjacent the sidewalls of the baler. Each end sensor is often positioned along a stretch of the corresponding element to detect when the stretch becomes slackened. It will be appreciated that the elements are traditionally tensioned by a single slack takeup mechanism, and accordingly, slackening of one of the elements relative to the remaining elements indicates that the area of the baling chamber bound by the one element is receiving less crop material than the others. Alternatively, the ends sensors are positioned along stretches of the elements defining the baling chamber so as to directly sense the diameter of the bale. The operator may consequently steer the baler left or right depending upon the diameter of the bale sensed adjacent the ends thereof.

However, these known expedients are problematic. Particularly, conventional bale shape monitors have complex and relatively expensive constructions. Additionally, a number of conventional monitors are not dependable and do not accurately sense the shape of the bale. For example, with monitors having a sensor for detecting the slack condition of one of the endless elements, the shape of the bale may not be accurately detected because of uneven stretching between the elements. Moreover, no baler has heretofore been provided with a monitor which effectively compares the diameter of the bale adjacent the ends thereof to the diameter of the bale at an intermediate location spaced between the ends, so that the operator is signaled when the ends are deficient relative to the middle of the bale. As will subsequently be described, this significantly simplifies the construction of the monitor and more accurately detects bale shape to improve uniform bale formation.

OBJECTS AND SUMMARY OF THE INVENTION

Responsive to these and other problems, an important object of the present invention is to provide a round baler with an improved bale shape monitor for facilitating uniform bale formation. Another important object of the present invention is to provide a bale shape monitor that is more dependable yet less expensive and complex in construction than conventional monitors. More particularly, an important object of the present invention is to provide a bale shape monitor that effectively compares the diameter of the bale adjacent the ends thereof to the diameter adjacent the middle of the bale. Yet another important object of the present invention is to provide such a bale shape monitor which signals to the operator when the diameter adjacent one of the ends of the bale is less than the diameter at the middle of the bale.

In accordance with these and other objects evident from the following description of a preferred embodiment of the invention, the round baler includes a pair of end sensors and an intermediate sensor. The end sensors sense the diameter of the bale at end locations adjacent opposite ends of the bale, while the intermediate sensor senses the diameter of the bale at an intermediate location spaced between the end locations. The monitor further includes a signal responsive to the sensors to indicate to the operator when the diameter of the bale at one of the end locations is less than the diameter at the intermediate location.

It has been determined that the middle of the bale (i.e., the portion of the bale spaced substantially equally between the sidewalls of the baler) rarely has less density or a smaller diameter than both ends of the bale. As the baler is weaved along the windrow, crop material is essentially continuously delivered to the middle of the baling chamber. This is due to the fact that the incoming crop material will naturally propagate to the middle of the baling chamber. Furthermore, because of the width of traditional windrows, crop material is virtually constantly delivered to the middle of the baling chamber, even when the windrow is intentionally picked up along one side of the baler. Accordingly, it is highly unlikely that the middle of the bale will be deficient relative to both ends of the bale, as long as the baler is weaved along the windrow. In other words, there is little risk of a bale having a so-called "hourglass shape".

The present invention is specifically designed to prevent the more likely situation of the bale having a so-called "egg or football shape", wherein the ends of the bale have less density and a smaller diameter than the middle of the bale. The claimed bale shape monitor essentially compares the diameter of the bale sensed by the end sensors to the diameter of the bale sensed by the intermediate sensor, and signals the operator when the former is less than the latter. As will be apparent from the following description, the inventive bale shape monitor is relatively more dependable, yet more simple and inexpensive in construction, than conventional devices.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein.

Figure 10:
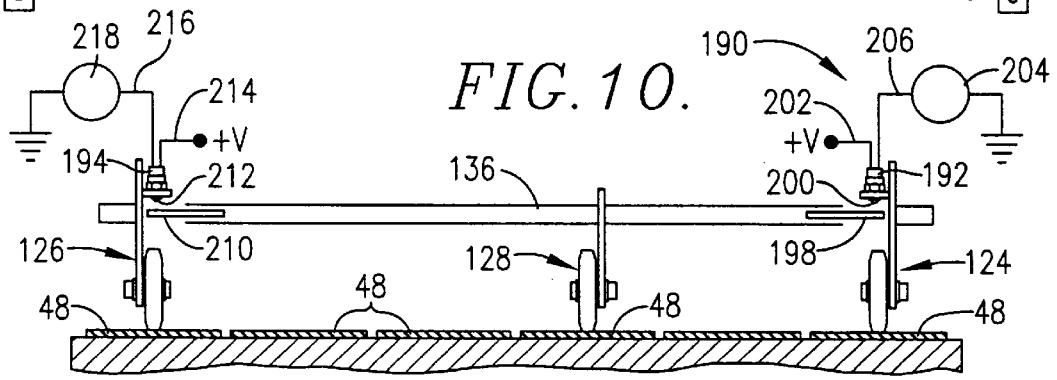
FIG. 10 is schematic view of the bale shape monitor, particularly illustrating the condition of the monitor when the bale has a generally uniform diameter from end to end.
Figure 11:
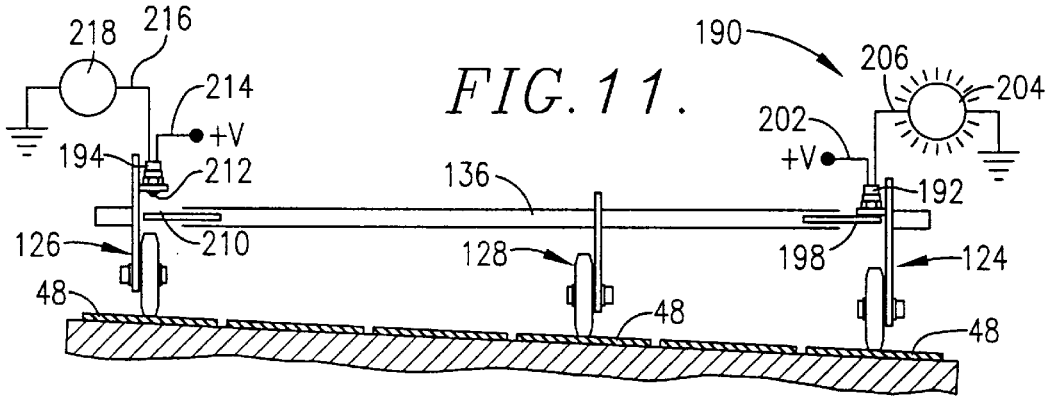
Figure 12:
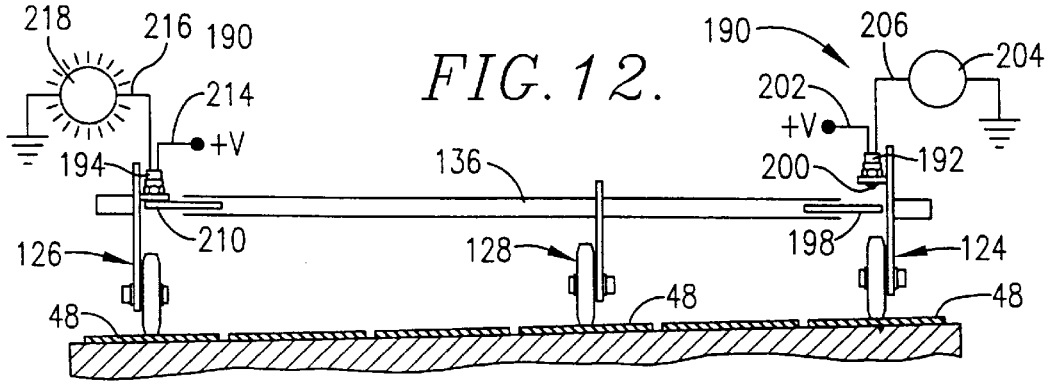

FIG. 11 is a schematic view of the bale shape monitor similar to FIG. 10, but illustrating the condition of the monitor when the diameter of the bale adjacent its left end is less than the diameter at the middle of the bale; and FIG. 12 is a schematic view of the bale shape monitor similar to FIG. 10, but illustrating the condition of the monitor when the diameter of the bale adjacent its right end is less than the diameter at the middle of the bale.

DETAILED DESCRIPTION OF THE PREFERRED EMBODIMENT

Figure 1:
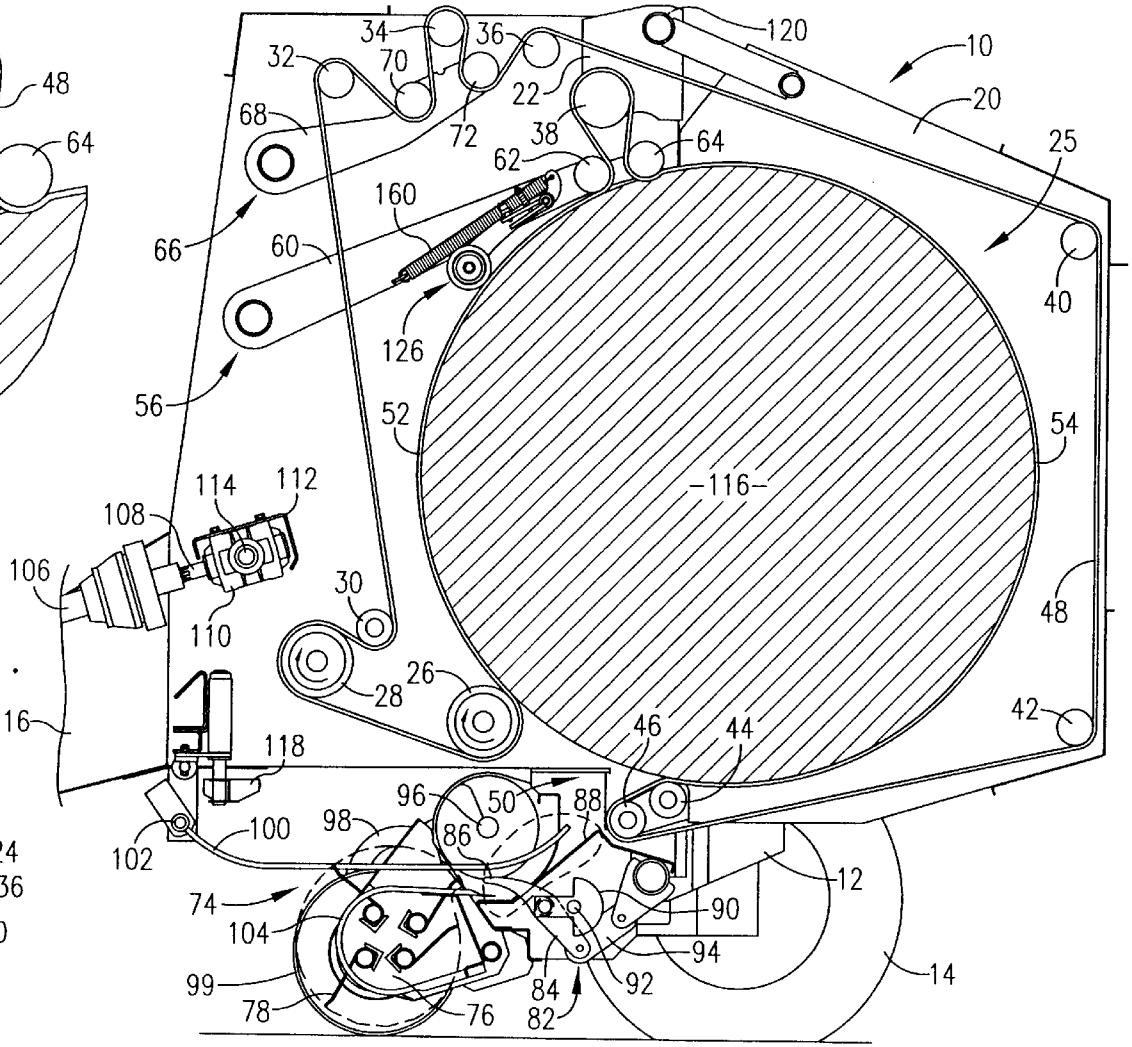
FIG. 1 is a fragmentary, side elevational view of a round baler with the left sidewall and various other parts being removed to illustrate internal details of construction including the bale shape monitor constructed in accordance with the principles of the present invention, with the baler containing a full-size bale.

Turning initially to FIG. 1, the round baler 10 selected for illustration generally includes a chassis or frame 12 that is supported for travel by a pair of ground wheels 14 (only the right ground wheel being shown in the drawings figures). A tongue 16 projects forwardly from the chassis 12 for connection with a towing vehicle (not shown). The chassis 12 carries a pair of upright, laterally spaced sidewalls 18 and 20 (see also FIG. 3) which cooperate to define a space within which bale forming and bale wrapping operations may be carried out as the baler is advanced across a field. A pair of left and right frame members 22 and 24 extend upwardly from the chassis 12 to assist with supporting the sidewalls 18 and 20 in their upright disposition.

In the present embodiment, the baler 10 includes a number of rolls and belts that cooperate with the sidewalls 18,20 to define an internal baling chamber 25 that assumes different shapes and sizes throughout the bale-forming cycle. Particularly, the baler 10 has a plurality of laterally extending, stationary rolls including a rear drive roll 26, a front drive roll 28, and a plurality of idler rolls 30,32,34, 36,38,40,42,44,46. The stationary rolls 26–46 are arranged between the sidewalls in a generally circular pattern (when viewing FIGS. 1 and 2) for guiding a plurality of laterally spaced, endless belts 48, as the belts are driven linearly during bale formation and wrapping. As perhaps best shown in FIG. 3, the illustrated baler 10 includes six of the belts 48. The rear drive roll 26 and the idler roll 46 are located generally at the bottom of the baling chamber 25 and are spaced apart in a generally fore-and-aft direction to define a non-compressive, chamber inlet opening 50 therebetween. As the bale grows progressively larger, the idler roll 44 eventually cooperates with the idler roll 46 to define the rear boundary of the inlet opening 50, for purposes which will subsequently be described. The belts 48 are looped under the rear drive roll 26, under the tailgate-mounted idler roll 46, and over the large upper idler roll 38 so that the belts present a pair of generally upright belt stretches 52 and 54 when the baling chamber 25 is empty at the beginning of a bale-forming cycle (see FIG. 2).

Figure 2:
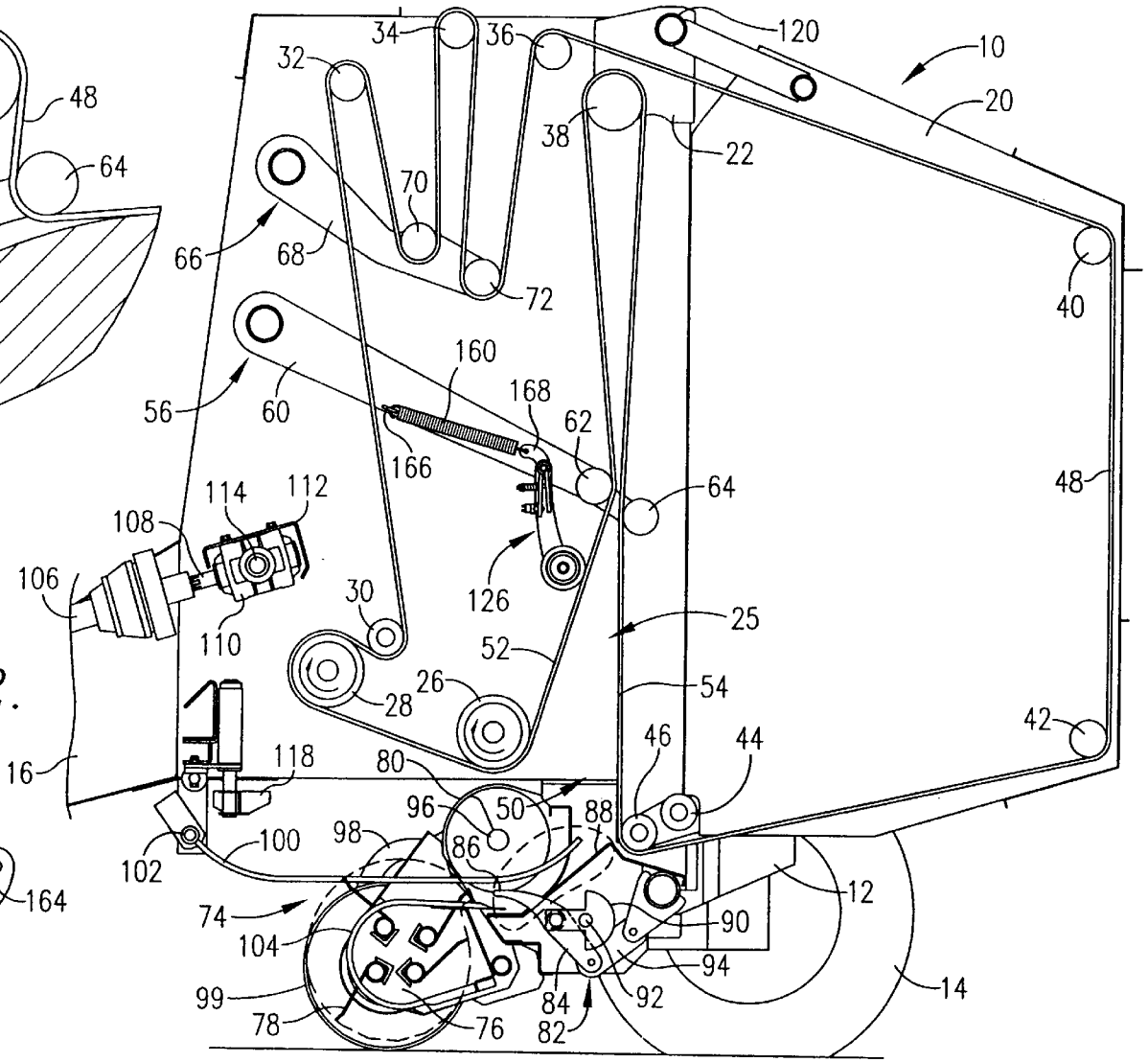
FIG. 2 is a fragmentary, side elevational view of the round baler similar to FIG. 1, but illustrating the bale forming components in their initial start-up configuration (i.e., with the baling chamber empty)

The bale forming mechanism further includes a belt guiding or retaining assembly 56 having a pair of vertically swingable arms 58 and 60 located inside the baler adjacent the sidewalls 18 and 20. The arms 58,60 support two idler rolls 62 and 64 in a position to directly overlie the bale during its formation within the chamber 25. Further, the arms 58,60 are yieldably biased downwardly so that the rolls 62,64 exert pressure against the top of the bale as it is formed. The rolls 62 and 64 are spaced apart by a distance which is much less than the width of the inlet opening 50, and the vertical belt stretches 52 and 54 are confined between the rolls 62 and 64 in such a manner that the belt stretches 52,54 converge toward one another as the rolls 62,64 are approached. Since the rolls 62,64 are essentially directly above the inlet opening 50, the rolls 62,64 cause the chamber 25 to assume a generally vertical, triangular configuration when the chamber 25 is empty and the arms 58,60 are in their lowermost position as shown in FIG. 2. With the drive rolls 26 and 28 rotating in a clockwise direction as depicted in FIGS. 1 and 2, the front belt stretch 52 moves in a downward direction, while the rear belt stretch 54 moves in an upward direction, when the chamber 25 is empty at the beginning of a new bale forming cycle. A slack control arm assembly 66 located in the upper front portion of the baler 10 includes a pair of vertically swingable arms 68 (only one being shown) that support idler rolls 70 and 72. As those of ordinary skill in the art will appreciate, the assembly 66 controls the amount of slack paid out to the belts 48 as the bale grows within the chamber 25.

The baling chamber 25 is obviously located well above and off the ground. Therefore, some means must be provided for picking up crop material as the baler moves across the field and for delivering the picked-up material into the chamber 25. In the illustrated embodiment, the baler 10 is constructed in accordance with the principles of open throat, vertical chamber baling, such that the incoming crop material is not to be subjected to any significant compression until it passes through the inlet opening 50 and is fully received within the baling chamber 25. Thus, that part of the crop flow path upstream from the chamber 25 is open and non-compressive and may be described as an open throat 74 through which the picked-up crop material passes on its way to the baling chamber 25.

In the illustrated embodiment, the crop material is picked up off the ground by a standard resilient rotary rake tine assembly 76 located below and forwardly of the chamber 25 and its inlet opening 50. The assembly 76 is positioned along the lower portion of the throat 74 and cooperates with the rear drive roller 26 in helping to define the throat 74. The resilient rake tines 78 of the assembly 76 describe a somewhat circular path of travel as shown in phantom lines in FIGS. 1 and 2, although the tines 78 actually are cam-operated and are caused to retract along the rear stretch of their path of travel.

If the rake tine assembly 76 selected for use is wider than the chamber 25 in a direction transverse to the path of travel of the machine, the picked-up material must be converged toward the center of the baler 10 by center-gathering stub augers 80 (only one being shown in FIGS. 1 and 2) or the like before being delivered into the chamber 25. One suitable stub auger construction for accomplishing this function is disclosed in co-pending application Ser. No. 08/731,764, filed Oct. 18, 1996 and titled "Down Turning Stub Augers on Wide Pick-Up for Round Balers". If the rake tine assembly 76 is the same width as the chamber 25, a center-gathering mechanism is not needed.

A rigid tooth feeder 82 is positioned below and in vertical alignment with the inlet opening 50 between the resilient rake tine assembly 76 and the lower idler roll 46 along the lower stretch of the throat 74. The feeder 82 is spaced below the rear drive roll 26 and helps to define the throat 74. In the preferred embodiment, the feeder 82 takes the form of a fork 84 having a series of transversely spaced, rigid teeth 86 that move in a generally kidney-shaped path of travel illustrated in phantom lines in FIGS. 1 and 2. The teeth 86 project into the throat 74 during a stuffing stroke along the upper half of their path of travel and retract down out of the throat 74 during a return stroke along the lower half of their path of travel. A slotted ramp 88 spanning the distance between the resilient tine assembly 76 and the lower idler roll 46 provides a floor for the throat 74 in the vicinity of the rigid tooth feeder 82 and serves as a stripper plate through which the teeth 86 may retract to release the crop material at the rear end of the path of travel of the teeth 86.

The fork 84 is pivotally supported by a rotating carrier 90 that rotates continuously about a transverse horizontal axis 92. The fork 84 is connected near its mid-point to the carrier 90 and has its lower extended end pivotally connected to a control link 94 pivotally coupled with the chassis 12. Thus, although the carrier 90 rotates in a circular path of travel, the fork 84 is constrained to move in its kidney-shape path of travel as illustrated. As shown in FIGS. 1 and 2, the idler rolls 46 and 44 cooperate with the ramp 88 when the bale in chamber 25 grows larger than a starting core to define an eased path along which incoming crop material travels as it enters the chamber 25 as disclosed in co-pending application Ser. No. 08/731,395, filed Oct. 18, 1996, and titled "Eased Inlet Tailgate Roll Arrangement for Variable Chamber Round Baler". This configuration of the inlet opening 50 provides an aggressive nip between the belts 50 and the bale to facilitate the addition of crop material to the bale during the bale-forming cycle.

Contrary to prior open throat, vertical chamber constructions, the baler 10 has no starter roll located in the chamber 25 behind the rear drive roll 26. However, also contrary to prior open throat vertical chamber constructions, the baler 10 has the rigid tooth feeder 82 disposed below the open bottom of the chamber 25 in vertical alignment with the inlet opening 50. Consequently, the rigid tooth feeder 82 is positioned for projecting crop materials into the chamber 25 during successive stuffing strokes, whether such materials comprise only incoming materials received from the resilient tine assembly 76 or also materials that may have fallen down out of the chamber 25 during the early stages of bale core starting. The no starter roll construction of the illustrated baler 10 is the subject of copending application Ser. No. 08/896,720, filed Jul. 18, 1997, and titled "Vertical Chamber, Open Throat Round Baler Having No Starter Roll".

In the illustrated embodiment, the resilient rake tine assembly 76 is mounted on the chassis 12 for up and down swinging movement about a transverse axis 96 (FIGS. 1 and 2) which coincides with the axis of rotation of the stub augers 80. Gauge wheels 99 (only the right wheel being shown) secured to the resilient rake tine assembly 76 by inverted, generally U-shaped arms 98 (only a portion of one of the arms being shown in FIGS. 1 and 2) ride along the ground to cause the resilient tine assembly 76 to swing up or down as necessary to accommodate changes in ground contour. It will be noted that in the illustrated embodiment, the stub augers 80 and the rigid tooth feeder 82 do not pivot with the resilient tine assembly 76 but are instead mounted in fixed positions on the chassis 12. However, it is within the scope of the present invention to have all three of the components comprising the rake tine assembly 76, the rigid tooth feeder 82 and the stub augers 80 constructed as part of a header unit swingably attached to the chassis 12. In the illustrated embodiment, the gauge wheels 99 are attached to the resilient tine assembly 76 in the manner disclosed and claimed in co-pending application Ser. No. 08/733,758, filed Oct. 18, 1996, and titled "Over-the-top Support Arm for Pick-up Gauge Wheel of a Baler".

As shown in FIGS. 1 and 2, the baler 10 is provided with a standard windguard 100 overlying the resilient rake tine assembly 76. The windguard 100 is pivoted to the chassis 12 at pivot 102 and is biased by gravity to lie against the wrapper 104 of the resilient tine assembly 76 and the ramp 88 associated with the rigid tooth feeder 82. As incoming crop material flows through the throat 74, the windguard 100 is raised off the wrapper 104 and the ramp 88 by the moving crop material. However, the windguard 100 provides no significant compaction of the crop material.

As illustrated in FIGS. 1 and 2, power for operating the components of the baler is delivered by a driveline 106 associated with the tongue 16. The front end of the driveline 106 is adapted for connection to the power take-off shaft (not shown) of the towing vehicle, while the rear end of the driveline 106 is coupled with the input shaft 108 of a right angle gear box 110 on a transverse structural member 112 of the chassis 12. The output shaft 114 of the right angle gear box 110 is coupled in the usual manner with the various drives for the baler components.

When the bale is fully formed within the chamber 25 as illustrated by the bale 116 in solid lines in FIG. 1, it may be wrapped by a suitable wrapper before being discharged from the baler. In the illustrated embodiment, a twine dispenser 118 is located adjacent the front of the baler above the windguard 100 for wrapping the finished bale with twine during the wrapping cycle of the machine. Once wrapped, the bale may be discharged from the baler by operating a pair of lift cylinders (not shown) on opposite sides of the machine to elevate the rear half of the sidewalls 18,20 and the rolls 40,42,44,46 supported thereon. The rear half of the machine thus functions as a tailgate that is attached to the front half and pivots relative thereto about an upper pivot 120 at the top of the baler 10.

BALE SHAPE MONITOR

During the bale-forming cycle, the rotary rake tine assembly 76, stub augers 80 and the tooth feeder 82 cooperatively deliver material picked up from a crop windrow (not shown) to the baling chamber 25. Generally speaking, with a few exceptions (e.g., the crop material picked up outboard of the sidewalls 18,20 and converged centrally by the stub augers 80), the crop material is delivered to the baling chamber 25 at generally the same lateral location relative to the sidewalls 18,20 at which the windrow was picked up off the ground by the rotary rake tine assembly 76. For example, when the baler 10 is positioned relative to the windrow so that crop material is picked up by the center portion of the rotary rake tine assembly 76, the crop material is in turn delivered generally to the middle of the baling chamber 25. Because most crop windrows are traditionally narrower than the length of the baling chamber 25, the baler 10 must be skillfully weaved from side to side for ensuring even delivery of crop material between the sidewalls 18 and 20; otherwise the bale will likely have a nonuniform shape, with the diameter of the bale varying from end to end. This is tedious and tiresome for even the most experienced bale operators.

Accordingly, the baler 10 is provided with an improved bale shape monitor 122 for facilitating uniform bale formation. The illustrated monitor 122 effectively compares the diameter of the bale adjacent its ends to the diameter at the middle of the bale, and signals the operator when the one of the end diameters is less than the middle diameter. As will be apparent from the following description, the monitor 122, which is constructed in accordance with the principles of the present invention, has a relatively simple and inexpensive, yet dependable construction.

Figure 3:
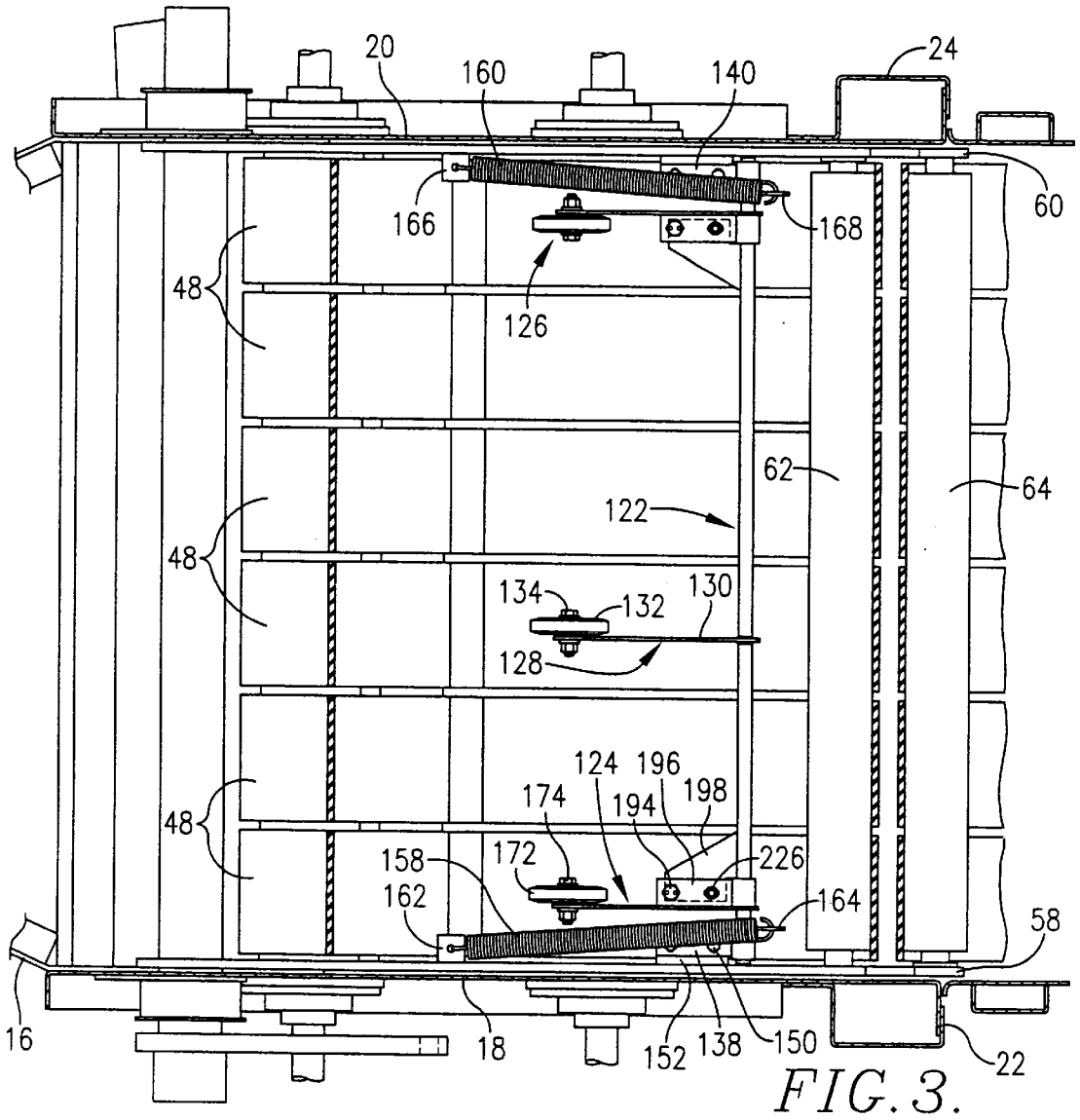
FIG. 3 is an enlarged, fragmentary, horizontal sectional view looking downwardly at the front half of the baler, particularly illustrating the location of the end sensors and the intermediate sensor between the sidewalls of the baler.

As perhaps best shown in FIG. 3, the monitor 122 includes a pair of end sensors 124 and 126 for sensing the diameter of the bale adjacent the sidewalls 18 and 20. It may be said that each of the sensors 124 or 126 senses the bale diameter at an end location adjacent one of the ends of the bale. The monitor 122 further includes an intermediate sensor 128 spaced substantially equally between the end sensors 124,126 for sensing the diameter at the middle of the bale. The intermediate sensor 128 senses the bale diameter at an intermediate location spaced between the end locations. In this respect, the monitor 122 is provided with means for sensing the bale diameter at three locations spaced along the length of the bale. The bale diameter sensed at each end location is continuously gauged relative to the bale diameter sensed at the intermediate location so that the operator is notified whenever one of the end locations has a smaller diameter than the intermediate location, as will be further described. This construction is particularly effective in assisting the operator with weaving of the baler 10 along the windrow so as to avoid the formation of bales having an egg or football shape.

In the illustrated embodiment, the intermediate sensor 128 is in the form of a shiftable diameter gauge associated with one of the centermost belts of the baler 10. Particularly, the intermediate sensor or gauge 128 includes an arm 130 swingably mounted to the baler 10, and a feeler wheel 132 mounted to one end of the arm 130 by a nut-and-bolt assembly 134 (see FIG. 3). A bearing assembly (not shown) contained within the wheel 132 serves to journal the latter on the nut-and-bolt assembly 134 for relative rotational movement. The wheel 132 is preferably formed of a rubber material, although other suitable materials, such as plastic or metal, may be used.

The location of the intermediate sensor 128 is such that the wheel 132 rides against the front stretch 52 of the third belt spaced from the left sidewall 18. As perhaps best shown in FIG. 3, the wheel 132 is located substantially equally from the sides of the belt so as to reduce the risk of disengagement therebetween should there be any problems with belt tracking. Those of ordinary skill in the art will appreciate that the location of the wheel 132 along the backside of the front stretch 52 ensures that the diameter at the middle of the bale is positively sensed by the intermediate sensor 128. That is to say, the wheel 132 engages one of the belt stretches 52 defining the baling chamber 25 so that the location of the wheel 132 directly corresponds to the diameter of the bale. The intermediate sensor 128 may alternatively be located adjacent the rear of the baling chamber 25, with the wheel 132 engaging one of the centermost belts along the rear stretch 54 thereof, if desired. It is also noted that the term "middle" as used herein shall be interpreted to mean a location spaced generally equally between the ends of the bale. With respect to the illustrated embodiment, the diameter of the middle of the bale is sensed even though the wheel 132 for the intermediate sensor 128 is spaced slightly leftward of the center of the baler. Of course, the principles of the present invention are equally applicable to a baler having an odd number of belts (e.g., seven belts) so that the wheel for the intermediate sensor is closer to the center of the baling chamber than depicted in the drawing figures. In fact, such a construction may allow the intermediate location to be spaced virtually equally from the sidewalls (i.e., from the ends of the bale).

Figure 4:
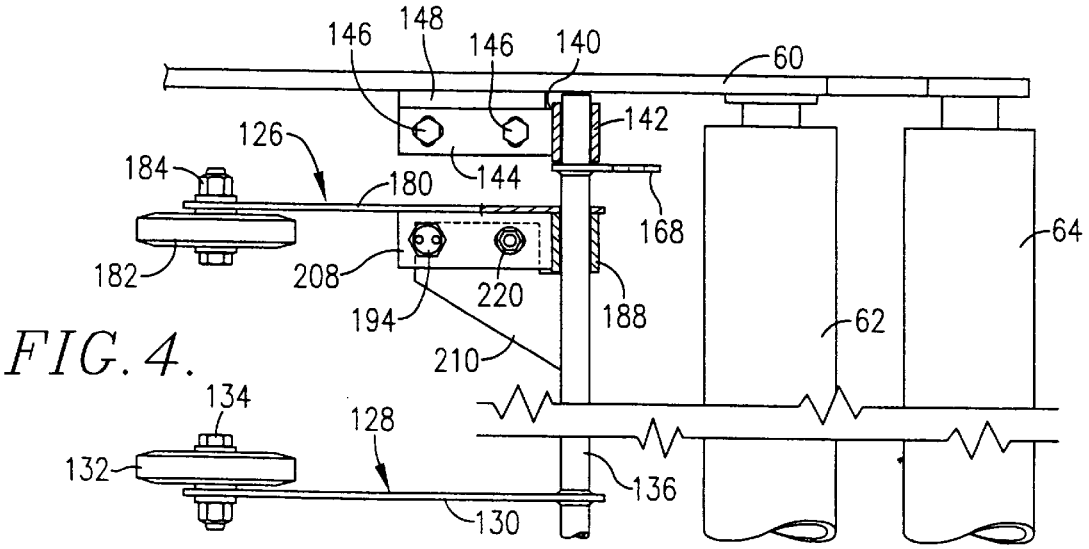
FIG. 4 is an enlarged, fragmentary, horizontal sectional view of the upper end of the right retainer arm and a portion of the bale shape monitor, particularly illustrating the structure for mounting the sensors to the arm.
Figure 9:
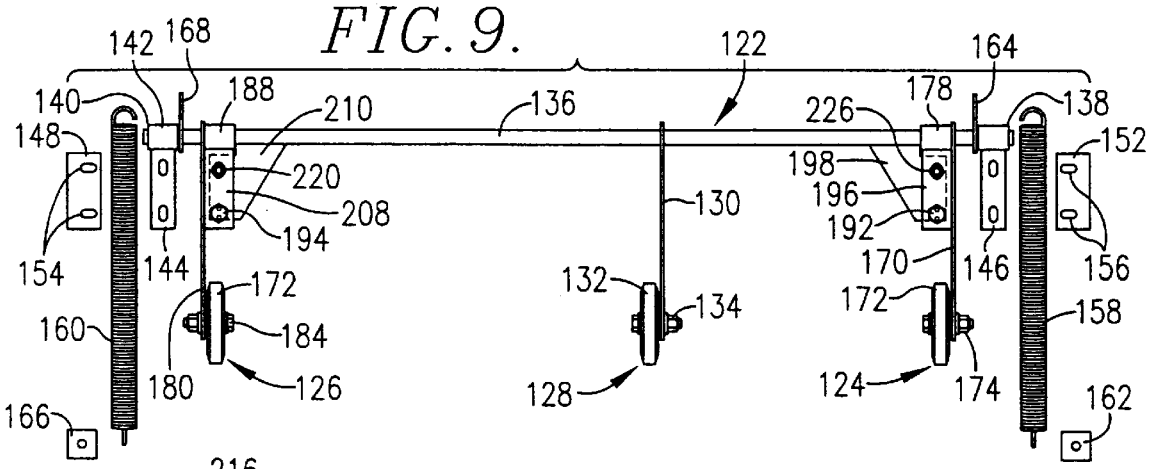
FIG. 9 is an enlarged, top plan view of the parts of the bale shape monitor which are mounted to the baler.

A cylindrically shaped, transverse bar 136 is provided for swingably supporting the arm 130 of the intermediate sensor 128 on the baler 10. As shown in FIGS. 3 and 4, the arm 130 is fixed to the bar 136 by suitable means, such as welding, at a position laterally aligned with one of the centermost belts. Adjacent opposite ends of the bar 136 are bearing supports 138 and 140 for rotatably supporting the bar 136 on the belt retaining arms 58 and 60. As shown in FIG. 4, the right bearing support 140 comprises a sleeve 142 rotatably receiving the right end of the bar 136, and a support plate 144 projecting from the sleeve 142. A pair of nut-and-bolt assemblies 146 serve to fasten the support plate 144 to a bracket 148 fixed to the right retaining arm 60 adjacent the rolls 62 and 64. The left bearing support 138 is similar in construction to the right bearing support 140 and therefore will not be described in detail. It is sufficient to explain that the left bearing support is similarly fastened by a pair of nut-and-bolt assemblies 150 to a bracket 152 projecting inwardly from the left retaining arm 58 (see FIGS. 3 and 9). A pair of holes 154 provided in the right bracket 148 for receiving the nut-and-bolt assemblies 146 have an elliptical shape to accommodate for manufacturing errors, etc. The left bracket 152 is likewise provided with elliptically shaped holes 156.

The intermediate sensor 128 is consequently mounted on the retaining arms 58 and 60 for swinging movement therewith. This convenient construction maintains the proximity between the baling chamber 25 and the support structure for the intermediate sensor 128 so as to reduce the size and cost of the intermediate sensor.

The wheel 132 of the intermediate sensor 128 is yieldably biased against the corresponding belt by a pair of tension springs 158 and 160 located adjacent opposite ends of the bar 136. As perhaps best shown in FIG. 3, the left spring 158 is connected between a tab 162 fixed to the left retaining arm 58 to project inwardly therefrom and a crank 64 projecting from the left end of the bar 136. It will be noted that the tab 162 and crank 64 each include a small hole for removably receiving the respective hook-shaped end of the spring 158. The right spring 160 is likewise associated with a tab 162 fixed to the right retaining arm 60 and a crank 164 fixed to the right end of the bar 136. In this respect, the springs 158 and 160 cooperate to yieldably urge the bar 136, and thereby the arm 130, in a direction that causes the wheel 132 to be pressed against the front stretch 52 of the corresponding belt for maintaining contact therebetween in virtually all chamber conditions. Because the location of the arm 130 and wheel 132 constantly coincide with the shape of the bale underlying the corresponding belt, the intermediate sensor 128 continuously senses the bale diameter at the middle of the bale.

Each of the end sensors 124 and 126 is also in the form of a shiftable bale diameter gauge. Furthermore, the end sensors 124 and 126 similarly engage the front stretch 52 of the belts, but do so along the endmost belts of the baler 10. Because of these similarities, it will be appreciated that the same caveats and alternatives noted above with respect to the intermediate sensor 128 likewise apply to the end sensors 124 and 126.

Figure 8:
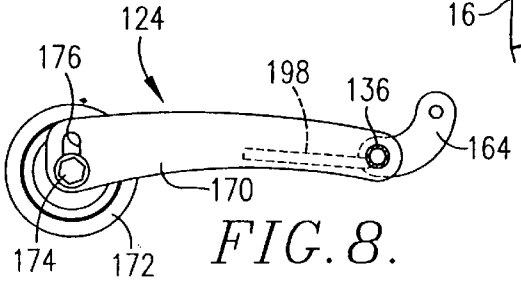
FIG. 8 is an enlarged, side elevational view of the left end sensor and other parts of the bale shape monitor.

The left end sensor 124 includes a swingable arm 170 and a rotatable wheel 172 mounted adjacent one end of the arm 170 by a nut-and-bolt assembly 174. The wheel 172 is journaled on the nut-and-bolt assembly 174 for relative rotational movement by a bearing assembly (not shown) contained within the wheel 172. As shown in FIG. 8, the arm 170 is provided with an elongated hole 176 for receiving the nut-and-bolt assembly 174, for purposes which will subsequently be described. Fixed to the opposite end of the arm 170 is a cylindrical collar 178 for supporting the arm 170 on the bar 136. The collar 178 loosely receives the bar 136 so as to allow relative movement therebetween. However, as will further be described hereinbelow, swinging movement of the arm 170 relative to the bar 136 is limited so that the springs 158 and 160 also serve to yieldably urge the arm 170 in a clockwise direction (viewing FIG. 8) for causing the wheel 172 to be yieldably pressed against the front stretch 52 of the leftmost belt. Additionally, the location of the collar 178 along the length of the bar 136 is similarly maintained so that the wheel 172 presses against the leftmost belt at a point spaced equally between the sides of the belt.

The right end sensor 126 is structurally and functionally similar to the left end sensor 124, and it is therefore sufficient to explain that the right end sensor 126 includes a swingable arm 180 and a rotatable wheel 182 mounted to one end of the arm 180 by a nut-and-bolt assembly 184. As shown with phantom lines in FIG. 7, the arm 180 includes an elongated hole 186 for receiving the nut-and-bolt assembly, which facilitates calibration of the monitor 122 as will subsequently be described. A collar 188 fixed to the opposite end of the arm 180 and received on the bar 136, as perhaps best shown in FIG. 4, serves to swingably support the arm 188 on the bar 136. The wheel 182 of the right sensor 126 yieldably presses against the front stretch 52 of the rightmost belt at a point spaced equally between the sides of the belt (see FIG. 3).

In view of the foregoing, the position of the arm 170 and wheel 172 of the left end sensor 124 directly corresponds with the location of the leftmost belt as it moves responsive to bale growth, so that the left end sensor 124 senses the diameter of the bale underlying the leftmost belt (i.e., the diameter adjacent the left end of the bale). Similarly, the position of the arm 180 and wheel 182 of the right end sensor 126 directly corresponds with the location of the rightmost belt so that the right end sensor 126 senses the diameter of the bale underlying the rightmost belt (i.e., the diameter adjacent the right end of the bale). It will be appreciated that the end sensors 124 and 126 are not necessarily limited to being associated with the endmost belts of the baler 10; that is, in some baler constructions, it may be sufficient to associate the end sensors with a belt that is only proximate to the adjacent baler sidewall. For example, the bale diameter may be sufficiently detected by associating the end sensors 124 and 126 with a belt spaced inwardly from one or more of the other belts. Furthermore, it is entirely within the ambit of the present invention to utilize a pair of end sensors and an intermediate sensor with other variously constructed endless elements (e.g., chains) that cooperate with the baler sidewalls to define the baling chamber.

The illustrated bale shape monitor 122 further includes a signal generally referenced by the numeral 190 in FIGS. 10–12. The signal 190 is responsive to the sensors 124,126, 128 for indicating when one of the end sensors 124 or 126 detects a bale diameter that is less than the bale diameter sensed by the intermediate sensor 128. As will be apparent from the following description, the signal 190 cooperates with the sensors 124,126,128 to effectively compare the diameter at each end location to the diameter at the intermediate location and signal the operator when the former is less than the latter.

The signal 190 includes a pair of switches 192 and 194, one of which (switch 192) is associated with the left end sensor 124 and the other of which (switch 194) is associated with the right end sensor 126 (see FIG. 3). In the illustrated embodiment, the switches 192 and 194 comprise standard normally open, ball-type switches, although the principles of the present invention are equally applicable to various other switch constructions, such as normally closed switches. In any case, activation of the switch shall be interpreted to mean that the state of the switch has been changed (e.g., if the switch is normally open as depicted in the illustrated embodiment, activation of the switch involves closing the switch so that the circuit path is completed). As will subsequently be described, the left switch 192 is operably coupled between the left end sensor 124 and the intermediate sensor 128 in such a manner that the switch 192 is activated as the sensors 124 and 128 shift relative to one another when the bale diameter adjacent the left end of the bale is less than the bale diameter at the middle of the bale. The right switch 194 is similarly coupled between the right end sensor 126 and the intermediate sensor 128 to be activated when the left end of the bale has a smaller diameter than the middle of the bale.

As perhaps best shown in FIG. 3, the left switch 192 is supported on a plate 196 projecting from the collar 178 so that the switch 192 swings with the arm 170 of the left end sensor 124. A somewhat trapezoidal shaped switch activating member 198 is fixed to the bar 136 so that swinging of the member 198 corresponds with swinging of the arm 130 of the intermediate sensor 128. As shown in FIG. 3, the support plate 196 for the switch 192 and the activating member 198 are partially superimposed. Accordingly, if the support plate 196 swings sufficiently downwardly as a result of the diameter adjacent the left end of the bale being less than the diameter at the middle of the bale, the ball or contact 200 (see FIGS. 10–12) of the left switch 192 engages the member 198 to thereby activate the switch 192. As shown in FIGS. 10–12, the switch 192 is connected to a power source by a lead 202 and to an indicator 206 by a lead 208. Accordingly, when the activating member 198 contacts the ball 200, the circuit path between the power source and the indicator 206 is completed, and the indicator 206 is thereby operated.

Figure 7:
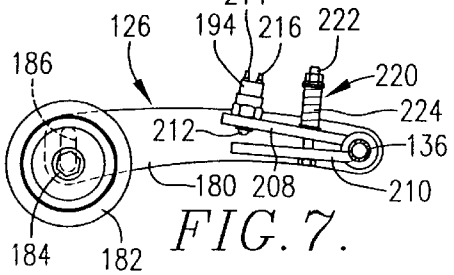
FIG. 7 is an enlarged, side elevational view of the right end sensor and the portion of the signal associated therewith.

Similar to the left switch 192, a support plate 208 serves to similarly fix the right switch 194 relative to the right arm 180 so that the switch 194 and the arm 180 swing together, as perhaps best shown in FIG. 7. A switch activating member 210 projecting from the bar 136 is configured to engage the ball or contact 212 of the switch 194, when the bale diameter adjacent the right end of the bale is less than the diameter at the middle of the bale. A lead 214 connects the right switch 194 with a power source, which may be the same power source connected to the left switch 192, and a second lead 216 connects the switch to an indicator 218, whereby the indicator 218 is operated when the switch 194 is activated.

Connected between the support plate 208 and the switch activating member 210 is a spring biasing mechanism 220. As perhaps best shown in FIG. 7, the mechanism 220 includes a nut-and-bolt assembly 222 and a compression spring 224 for yieldably biasing the support plate 208 toward the switch activating member 210. It will be noted that the illustrated compression spring 224 is retained between the nut of the assembly 222 and the support plate 208, although the spring may alternatively be retained between the bolt head and the switch activating member 210. In any event, the mechanism 220 serves to limit swinging movement of the support plate 208 relative to the activating member 210. In other words, swinging of the support plate 208 (and the right arm 170) in a clockwise direction (when viewing FIG. 7) is limited relative to the switch activating member 210 by the compressibility of the spring 224 and the length of the nut-and-bolt assembly 222. Because the activating member 210 is yieldably biased in a counterclockwise direction by the springs 158,160, the support plate 208 and the right arm 180 are also biased in that same direction so that the wheel 182 yieldably presses against the rightmost belt. Furthermore, with the activating member 210 being fixed relative to the arm 130 of the intermediate sensor 128, swinging movement of the right arm 180 is also limited relative to the position of the intermediate arm 130. It is also noted that the compression spring 224 assists the springs 158 and 160 in causing the wheel 182 of the right end sensor 126 to be yieldably pressed against the rightmost belt. In addition, the spring 224 ensures contact between the ball 212 of the switch 194 and the activating member 210 when the diameter adjacent the right end of the bale is less than the diameter at the middle of the bale. With the support plate 208 being fixed to the right arm 180 and the switch activating member 210 being fixed to the bar 136, the mechanism 220 also serves to maintain the location of the right end sensor 126 along the bar 136.

Because swinging movement of the right arm 180 relative to the intermediate arm 130 is limited, there may be instances in which the wheel 182 of the right end sensor 126 disengages the rightmost belt. This may occur because the diameter adjacent the right end of the bale is severely deficient relative to the diameter at the middle of the bale, whereby the right end arm 180 is swung completely toward the baling chamber relative to the intermediate arm 130. It will be appreciated that such swinging of the right end arm 180 relative to the intermediate arm 130 is limited by the interengagement between the switch 194 and the activating member 210. Accordingly, even in this situation, the right end sensor 126 continues to "sense" the bale diameter adjacent the right end of the bale as being less than the diameter at the middle of the bale.

Although not shown in detail, a similar spring biasing mechanism 226 is connected between the support plate 196 and the activating member 198 associated with the left end sensor 124 (see FIG. 3). The mechanism 226 is structurally and functionally similar to the mechanism 220 associated with the right end sensor 126. For the sake of brevity, the mechanism 226 will not be described in detail.

As indicated above, the arms 170 and 180 of the end sensors 124 and 126 are provided with elongated holes 176 and 186, respectively, which allows the operator to calibrate the bale shape monitor 122. The arm 130 of the intermediate sensor 128 is likewise provided with an elongated hole (not shown) which facilitates such calibration. It will be appreciated that calibration of the monitor 122 may be required as a result of manufacturing inaccuracies, uneven belt stretching, etc.

In the illustrated embodiment, the nut-and-bolt assembly 174 of the left end sensor 124 is located at the bottom of the hole 176 (see FIG. 8), and the nut-and-bolt assembly 184 of the right end sensor 126 is similarly located at the bottom of the hole 186 (see FIG. 7). Although not illustrated, it will be appreciated that the nut-and-bolt assembly 134 of the intermediate sensor 128 is located at the top of the slotted hole. This configuration ensures that there is a gap between the switches 192 and 194 and the switch activating members 198 and 210, respectively, when the diameter of the bale at the corresponding end location is substantially similar to the bale diameter at the middle of the bale. That is to say, this configuration reduces the likelihood of inadvertent operation of the indicators so as to further facilitate uniform bale formation. However, if for some reason calibration is required or an asymmetrical bale is desired, the nut-and-bolt assemblies may be shifted within the respective holes so as to vary the position of the wheel relative to the arm. For example, the nut-and-bolt assemblies 174 and 184 of the end sensors 124 and 126 may be shifted to the top of the holes 176 and 186, respectively, to promote formation of a bale having an hourglass shape.

The indicators 204 and 218, which are illustrated schematically in FIGS. 10–12, preferably comprise so-called "driving lights". In this respect, the indicators 204 and 218 are illuminated to alert the operator when the diameter adjacent the corresponding end of the bale is less than the diameter at the middle of the bale. The indicators 204 and 218 may be arranged side-by-side on a display panel (not shown), with the position of the indicators 204 and 218 corresponding to the location of their respective switches 192 and 194, so that the operator quickly associates illumination of one of the indicators with a deficiency along the corresponding end of the bale. For example, if the diameter of the bale adjacent the left end is less than the diameter of the middle of the bale, the left indicator 204 is illuminated. On the other hand, the position of the indicators 204 and 218 on the display panel may be reversed, and the indicators may be provided with indicia for signaling the operator to steer the baler in a direction which would cause more crop material to be delivered to the deficient end. For example, the indicator 204 associated with the left switch 192 may include the wording "steer right", so that the operated is alerted to steer the baler 10 righwardly for delivering relatively more crop material to the left side of the baling chamber 25. Preferably, the display panel supporting the indicators 204 and 218 is located within the cab of the towing vehicle (not shown). Moreover, the principles of the present invention are applicable to various other indicator constructions. For example, the indicators 204 and 218 may comprise an audible signal, such as a speaking sound stating "steer left" or "steer right", if desired. In addition, the monitor may include a third indicator (not shown) which is coupled to the switches 192 and 194 for signaling the operator to drive forward when both switches are not activated.

At the start of the bale-forming cycle, all of the sensors 124,126,128 are in a position best exemplified by the location of the right end sensor 126 depicted in FIG. 2. As crop material is progressively added to the baling chamber 25, the belt stretches 52 and 54 move away from one another in a generally circular manner, and the retaining arms 58 and 60 swing upwardly and carry with them the sensors 124, 126,128. However, the sensors 124,126,128 maintain contact with the respective belts for sensing the diameter of the bale underlying the belt. The bale forming components and the sensors 124,126,128 will eventually be disposed in the manner depicted in FIG. 1, which corresponds with a uniformly shaped, fully formed bale 116. If one of the ends of the bale has a diameter less than the diameter of the middle of the bale at any time between the start and finish of the bale-forming cycle, the bale monitor 122 will alert the operator of this condition so that the necessary corrections may be made.

Figure 5:
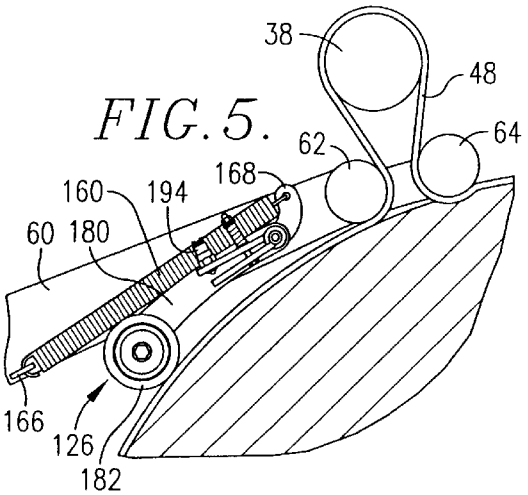
FIG. 5 is an enlarged, fragmentary side elevational view of the right retainer arm and a portion of the bale shape monitor, particularly illustrating the position of the right end sensor and the condition of the signal when the diameter adjacent the right end of the bale is substantially similar to the diameter at the middle of the bale.
Figure 6:
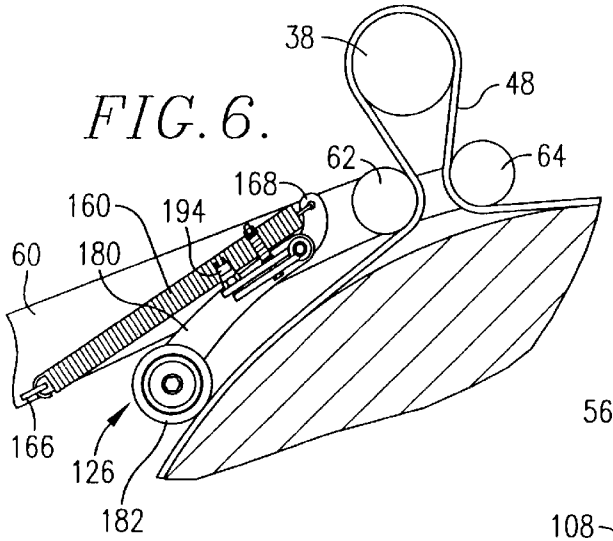
FIG. 6 is an enlarged, fragmentary side elevational view similar to FIG. 5, but illustrating the position of the right end sensor and the condition of the signal when the diameter adjacent the right end of the bale is less than the diameter at the middle of the bale.

For example, when the bale diameter adjacent the right end of the bale is substantially equal to the bale diameter at the middle of the bale, the switch 194 associated with the right end sensor 126 will not be activated, as depicted in FIGS. 5 and 10–11. However, if the bale diameter adjacent the right end of the bale is less than the bale diameter at the middle of the bale, the arm 180 of the right end sensor 126 will swing toward the baling chamber 25, while the arm 130 of the intermediate sensor 128 remains relatively stationary. This relative movement causes the right switch 194, which is fixed relative to the right arm 180, to engage the switch activating member 210, which is fixed relative to the intermediate arm 130, so as to activate the switch 194 and thereby operate the indicator 218 (see FIGS. 6 and 12). In effect, the bale diameter adjacent the right end of the bale is compared to the diameter at the middle of bale by the monitor 122, and the operator is alerted when this comparison reveals that the diameter at the end location is less than the diameter at the intermediate location. As depicted in FIG. 11, the monitor 122 is similarly configured to alert the operator when the diameter adjacent the left end of the bale is relatively less than the diameter at the middle of the bale.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention. For example, the bale shape monitor 122 may be utilized as a retrofit attachment for existing round balers. It will be appreciated that FIG. 9 conveniently illustrates the components of the monitor 122 which are attached to the baler.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. In a round baler including an expandable baling chamber which increases in size as a cylindrical bale is formed therein, a bale shape monitor comprising:

an end diameter sensor for sensing the diameter of the bale at an end location adjacent one of the ends of the bale;

an intermediate diameter sensor for sensing the diameter of the bale at an intermediate location spaced laterally inwardly from the end location; and a signal responsive to the diameter sensors to indicate when the diameter at the end location is less than the diameter at the intermediate location.

2. In a round baler as claimed in claim 1; and a second end diameter sensor for sensing the diameter of the bale at a second end location adjacent the end of the bale opposite from the first mentioned end location, said intermediate location being spaced between the end locations, said signal being further responsive to the second end and intermediate diameter sensors to indicate when the diameter at the second end location is less than the diameter at the intermediate location.

3. In a round baler as claimed in claim 2, each of said diameter sensors including a shiftable bale diameter gauge which shifts as the bale diameter changes.

4. In a round baler as claimed in claim 3, said gauge comprising a swingable arm and a roller rotatably supported adjacent one end of the arm to be positioned against the baling chamber.

5. In a round baler as claimed in claim 4, said gauge including biasing mechanism coupled with the arm for yieldably biasing the roller toward the baling chamber.

6. In a round baler as claimed in claim 3, said signal including a pair of indicators, each of which is associated with one of the end diameter sensors for signaling when the diameter of the bale at a corresponding one of the end locations is less than the diameter at the intermediate location.

7. In a round baler as claimed in claim 6, said indicators being operable independently of one another.

8. In a round baler as claimed in claim 7, said signal being electrically powered and including an electrical circuit having a pair of switches, each of said switches being associated with one of the end diameter sensors to operate a respective one of the indicators when the diameter of the bale at the corresponding end location is less than the diameter at the intermediate location.

9. In a round baler as claimed in claim 8, each of said indicators comprising a light.

10. In a round baler as claimed in claim 8, said gauge of each of the end diameter sensors cooperating with the gauge of the intermediate diameter sensor to present a pair of corresponding gauges which are operably coupled with a respective one of the switches for activating said respective one of the switches as the gauges shift relative to one another when the bale diameter at the corresponding end location is less than the diameter at the intermediate location.

11. In a round baler as claimed in claim 10, said respective one of the switches being fixed relative to one of the gauges of the corresponding pair, and including a contact which serves to activate the switch when engaged, said signal including a switch activating member fixed relative to the other of the gauges of the corresponding pair for engaging the contact as the gauges shift relative to one another when the bale diameter at the corresponding end location is less than the diameter at the intermediate location.

12. In a round baler including a plurality of laterally spaced endless elements disposed between a pair of sidewalls for cooperatively defining an expandable baling chamber which increases in size as a cylindrical bale is formed therein, a bale shape monitor comprising:

a pair of end diameter sensors associated with respective ones of the elements to sense the diameter of the bale at end locations adjacent opposite ends of the bale;

an intermediate diameter sensor associated with one of the elements spaced between said respective ones of the elements to sense the diameter of the bale at an intermediate location spaced between the end locations; and a signal responsive to the diameter sensors to indicate when the diameter of the bale at one of the end locations is less than the diameter at the intermediate location.

13. In a round baler as claimed in claim 12, each of said diameter sensors including a shiftable bale diameter gauge associated with a respective one of the elements, with the gauge being shifted as the bale diameter changes at the respective one of the elements.

14. In a round baler as claimed in claim 13, said gauge comprising a swingable arm and a roller rotatably supported adjacent one end of the arm, said roller being engageable with the respective one of the elements.

15. In a round baler as claimed in claim 14, said gauge including biasing mechanism coupled with the arm for yieldably biasing the roller against the respective one of the elements.

16. In a round baler as claimed in claim 13, said signal including a pair of indicators, each of which is associated with one of the end diameter sensors for signaling when the diameter of the bale at a corresponding one of the end locations is less than the diameter at the intermediate location.

17. In a round baler as claimed in claim 16, said indicators being operable independently of one another.

18. In a round baler as claimed in claim 17, said signal being electrically powered and including an electrical circuit having a pair of switches, each of said switches being associated with one of the end diameter sensors to operate a respective one of the indicators when the diameter of the bale at the corresponding end location is less than the diameter at the intermediate location.

19. In a round baler as claimed in claim 18, each of said indicators comprising a light.

20. In a round baler as claimed in claim 18, said gauge of each of the end diameter sensors cooperating with the gauge of the intermediate diameter sensor to present a pair of corresponding gauges which are operably coupled with a respective one of the switches for activating said respective one of the switches as the gauges shift relative to one another when the bale diameter at the corresponding end location is less than the diameter at the intermediate location.

21. In a round baler as claimed in claim 20, said respective one of the switches being fixed relative to one of the gauges of the corresponding pair, and including a contact which serves to activate the switch when engaged, said signal including a switch activating member fixed relative to the other of the gauges of the corresponding pair for engaging the contact as the gauges shift relative to one another when the bale diameter at the corresponding end location is less than the diameter at the intermediate location.

22. A bale shape monitor for attachment to a round baler including a plurality of laterally spaced endless elements disposed between a pair of sidewalls for cooperatively defining an expandable baling chamber which increases in size as a cylindrical bale is formed therein, said monitor comprising:

a pair of end diameter sensors and an intermediate diameter sensor;

support structure for mounting the diameter sensors on the baler so that the end diameter sensors sense the diameter of the bale at end locations adjacent opposite ends of the bale and the intermediate diameter sensor senses the diameter of the bale at an intermediate location spaced between the end locations; and a signal responsive to the diameter sensors to indicate when the diameter of the bale at one of the end locations is less than the diameter at the intermediate location.

23. A bale shape monitor as claimed in claim 22, each of said diameter sensors including a bale diameter gauge associated with a respective one of the elements, said support structure serving to shiftably mount the gauge on the baler so that the gauge shifts as the bale diameter changes at the respective one of the elements.

24. A bale shape monitor as claimed in claim 23, said gauge comprising a swingable arm and a roller rotatably supported adjacent one end of the arm, said roller being engageable with the respective one of the elements.

25. A bale shape monitor as claimed in claim 24, said gauge including biasing mechanism coupled with the arm for yieldably biasing the roller against the respective one of the elements.

26. A bale shape monitor as claimed in claim 23, said signal including a pair of indicators, each of which is associated with one of the end diameter sensors for signaling when the diameter of the bale at a corresponding one of the end locations is less than the diameter at the intermediate location.

27. A bale shape monitor as claimed in claim 26, said indicators being operable independently of one another.

28. A bale shape monitor as claimed in claim 27, said signal being electrically powered and including an electrical circuit having a pair of switches, each of said switches being associated with one of the end diameter sensors to operate a respective one of the indicators when the diameter of the bale at the corresponding end location is less than the diameter at the intermediate location.

29. A bale shape monitor as claimed in claim 28, each of said indicators comprising a light.

30. A bale shape monitor as claimed in claim 28, said gauge of each of the end diameter sensors cooperating with the gauge of the intermediate diameter sensor to present a pair of corresponding gauges which are operably coupled with a respective one of the switches for activating said respective one of the switches as the gauges shift relative to one another when the bale diameter at the corresponding end location is less than the diameter at the intermediate location.

31. A bale shape monitor as claimed in claim 30, said respective one of the switches being fixed relative to one of the gauges of the corresponding pair, and including a contact which serves to activate the switch when engaged, said signal including a switch activating member fixed relative to the other of the gauges of the corresponding pair for engaging the contact as the gauges shift relative to one another when the bale diameter at the corresponding end location is less than the diameter at the intermediate location.

* * * * *